No. 745,513. PATENTED DEC. 1, 1903.
W. J. NUSS.
APPARATUS FOR CONDENSATING STEAM.
APPLICATION FILED AUG. 21, 1903.
NO MODEL.
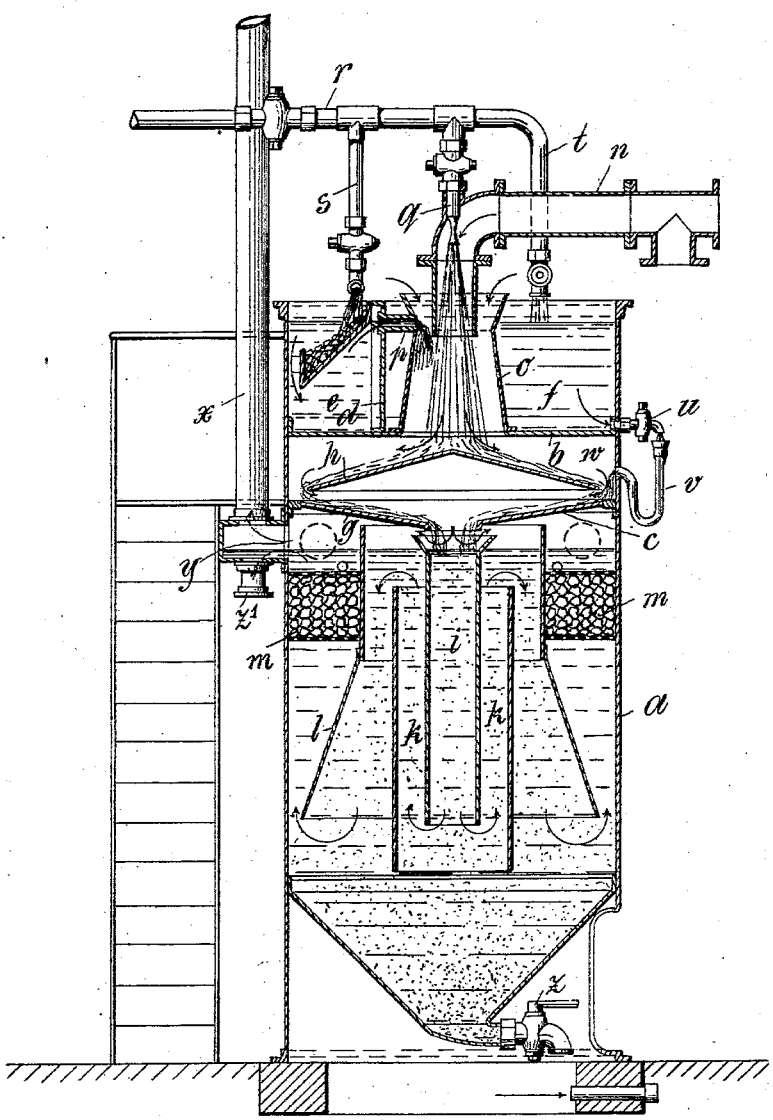

No. 745,513.

Patented December 1, 1903.

UNITED STATES PATENT OFFICE.

WILHELM JACOB NUSS, OF COLOGNE-LINDENTHAL, GERMANY.

APPARATUS FOR CONDENSATING STEAM.

SPECIFICATION forming part of Letters Patent No. 745,513, dated December 1, 1903.

Application filed August 21, 1903. Serial No. 170,317. (No model.)

*To all whom it may concern:*

Be it known that I, WILHELM JACOB NUSS, engineer, a subject of the King of Prussia, German Emperor, and a resident of Cologne-Lindenthal, Prussia, Germany, have invented certain new and useful Improvements in Apparatus for Condensating Steam and Purifying Water, of which the following is a specification.

My invention has for its object to provide for the suction of the steam by a water-injector and for mixing the stream of steam and water with an air-current, which in conjunction with the cool water condenses the steam, makes the water iron free, and raises its temperature so as to be suitable for feeding purposes. In combination with such means are provided several concentric precipitating-tubes and a common slime-pit, so that the water, which for the purpose of softening is mixed with lime and soda, descends and ascends several times before it rises to a filter, while the heavier impurities of the water precipitated in the middle tube catch and depress the lighter impurities precipitated in the other tube down into the common slime-pit.

These improvements are shown in the accompanying drawings, presenting a vertically-sectional view of the new apparatus.

The apparatus comprises a vertical cylinder $a$, which is divided by partitions $b$ and $c$ into three compartments. The upper compartment is by a vertical partition $d$ divided into two compartments $e\,f$, which serve as tanks for solutions of lime and soda. In the middle of these compartments is provided a flat hopper $g$ and a flat conical screen $h$. The undermost compartment contains two vertical concentric pipes $i\,k$, open at both ends. The outer pipe $k$, of larger diameter than the inner pipe $i$, has its ends standing in lower levels than the respective ends of the inner pipe. A mantle $l$, which is cylindrical at its upper part and conical at its under part, surrounds said pipes and is connected to an annular filter $m$.

$n$ represents the steam-pipe, the fore end of which is bent down into the upper end of a pipe $o$, having the form of two truncated cones having their small bases common or coincident. The upper cone is connected by a pipe $p$ with the lime-containing compartment $e$. Into the bent part of the steam-pipe $n$ an injector $q$ extends, which is connected to a water-supply pipe $r$. The latter is also provided with two branches $s\,t$ and cocks for simultaneously supplying the compartments $e$ and $f$ with fresh water. The solution of soda from the compartment $f$ flows through cock $u$ and pipe $v$ into the middle one of the compartments or the water-heater $w$. A funnel $x$ has connection with the upper part of the undermost compartment above its water-level by openings $y$.

$z$ designates the slime-discharge cock, and $z'$ the discharge-pipe for the purified water.

The operation of the apparatus is as follows: By the water-stream of the injector $q$ the steam passing the steam-pipe $n$ is sucked and forced with the water into the cones $o$. This mixture of steam and water on passing the cones forces along with it a current of air which enters the mouth of the upper cone $o$ under the effect of the draft exerted by the funnel $x$. The mixture of steam, water, and air on passing the cones $o$ is mingled with lime-water, which flows over from the compartment $e$ through pipe $p$ and is dropped into the middle of the compartments $w$, where it spreads over the screen $h$ and the hopper $g$ and is furthermore mingled with solution of soda supplied from the compartment $f$. The water-stream in conjunction with the air-current effects a condensation of the steam, while the cool water is brought to a high temperature suitable for use as feed-water. By the oxygen of the air in the mixture the iron of the water is oxidated, and so the water rendered free of iron, while by the addition of lime and soda to the water its carbonates and magnesia compounds are precipitated. By spreading the water over the screen $h$ and afterward contracting it in the hopper $g$ on simultaneously adding to it the chemical ingredients an intimate mingling of the water with these ingredients is effected. From the hopper $g$ the water drops into the pipe $i$, while the air forced along with the stream of steam and water is sucked by the funnel $x$ and removed. The water descends and ascends through the pipes $i\,k$ and mantle $l$ in a zigzag course, (shown by the arrows,) until it rises to the filter $m$, where it is delivered in a purified state through discharge-pipe $z'$. All the impurities contained in the water drop into and are caught in one common slime-pit provided with the cock $z$. By the shown arrangement of the concentric tubes $i\ k$ an efficient purifying of the water is attained, because the lighter impurities which percipitate in the pipe $k$ are caught and pressed down in the slime-pit by the heavier impurities precipitating in the pipe $i$. The descending and ascending movements of the water in the pipes $i\ k$ are caused by the different specific weights of the circulating water columns.

What I claim as my invention, and desire to secure by Letters Patent, is—

1. In an apparatus for condensating steam and purifying water, the combination of a steam-pipe which empties into a pipe made up of two truncated cones the small bases of which are coincident; a water-injector which extends into said steam-pipe; said pipe made up of two truncated cones the small bases of which are coincident; a pipe which connects the last-named pipe with a lime and water containing compartment; and said compartment.

2. In an apparatus for condensating steam and purifying water the combination with an injector for cool water, of a steam-pipe the forward end of which incloses this injector and is bent down into the upper mouth of a pipe having the form of two truncated cones with one common small basis, a pipe connecting these cones with a lime and water containing compartment, two or more vertical concentric tubes having their open ends in different levels for descending and ascending the circulating water and for precipitating the impurities before the water rises to a filter and a slime-pit common to all precipitating-tubes.

In witness whereof I have hereunto set my hand in presence of two witnesses.

WILHELM JACOB NUSS.

Witnesses:
CARL W. SCHMITT,
JOH SCHULZ.